United States Patent [19]

Jachimowicz et al.

[11] 3,894,172

[45] July 8, 1975

[54] MULTICABLE TELEPHONE CABLE IN A COMMON SHEATH

[75] Inventors: Ludwik Jachimowicz, Elizabeth; Jerzy Adam Olszewski, Edison, both of N.J.

[73] Assignee: General Cable Corporation, Greenwich, Conn.

[22] Filed: Nov. 6, 1973

[21] Appl. No.: 413,206

[52] U.S. Cl. .................... 174/34; 174/27; 174/103; 174/107; 174/110 F

[51] Int. Cl. .......................................... H01b 11/00

[58] Field of Search ......... 174/33, 34, 27, 103, 107, 174/113 R, 105 R, 105 B, 23 R, 116, 110 F

[56] References Cited

UNITED STATES PATENTS

| | | | |
|---|---|---|---|
| 3,025,656 | 3/1962 | Cook | 174/34 UX |
| 3,099,703 | 7/1963 | Martin | 174/34 |
| 3,102,160 | 8/1963 | Cook et al. | 174/34 X |
| 3,109,879 | 11/1963 | Martin | 174/34 |
| 3,271,508 | 9/1966 | Burr | 174/34 X |
| 3,344,228 | 9/1967 | Woodland et al. | 174/107 |
| 3,622,683 | 11/1971 | Roberts et al. | 174/27 X |
| R27,206 | 10/1971 | Gabriel et al. | 174/103 X |

FOREIGN PATENTS OR APPLICATIONS

| | | | |
|---|---|---|---|
| 923,900 | 4/1963 | United Kingdom | 174/34 |

*Primary Examiner*—Arthur T. Grimley

[57] ABSTRACT

This communication cable for telephone use has comparatively small numbers of pairs with the conductors of each pair twisted together with different lays and the pairs are assembled into shielded units. These units, which are preferably of the same construction as one another, are assembled in a twisted cable core with a shield around the core and spaced from the units, and a plastic jacket, of conventional construction, covering the shield.

10 Claims, 4 Drawing Figures

PATENTED JUL 8 1975 3,894,172

MULTICABLE TELEPHONE CABLE IN A COMMON SHEATH

BACKGROUND AND SUMMARY OF THE INVENTION

There is an increased use of telephone cables having symmetrical (balanced) pairs as a transmission medium for sending pulse code modulated (PCM) signals. A difficulty developed when the rate of pulses was increased. At about 1.5 Mbt/sec. (megabitz per second) the crosstalk between pairs was tolerable but when the rate was increased to the level of 3.5 or 5 Mbt/sec. the interferences, which are roughly proportional to frequency, made conventional cable unsuitable for transmission in both directions on pairs confined in one common cable sheath.

The remedy was to place instead of one, two separate cables, one for each direction of transmission to avoid differences in levels (magnitude of voltages) between signals on go and return circuits. Apart of being more expensive and requiring two conduits, one for each cable, the remedy still had its limitation when repeaters spacing was increased, to take advantage of the absence of near end crosstalk limitation. Far end crosstalk, cumulative with cable length, became the limiting factor, since the sum of unwanted energy, arriving into a given pair via far end crosstalk from large number of pairs in a cable, became prohibitive for a reasonable signal to noise ratio. (S/N ratio).

In order to minimize crosstalk, it is necessary to avoid proximity of pairs of the same, or nearly the same, twist (lays). The length of pair twist which can be employed is limited, however, from the smallest (approximately 1½ inches) to the largest (approximately 5 inches). Longer lays are impractical because in the process of assembling pairs in the cable it is not possible to retain accuracy of the twist. In large cables, having 50 pairs, there is a need to employ at least 22 pair lays to avoid proximity of pairs of the same twist length.

Dividing the available 5 inches −1.5 inches = 3.5 inches into 22 steps, makes one step only 3.5 ÷ 22 = 0.15 inches long, not sufficient step to obtain desirable crosstalk separation between pairs. If, however, the same available 3.5 inches are distributed between lays of 12 pairs the separation steps available are doubled and/or the designers may drop from consideration the longest lays, say over 4½ inches, thus improving process reliability in assembling 12 pair bundle. All these measures permit wider spacing between expensive repeaters, since cumulative crosstalk powers are made smaller by decreasing number of pairs in cable, and improving crosstalk between the pairs by better selection of pair twists.

The cable of this invention consists of a multitude of identical small cables twisted together to form one cable core. Over the cable core there is one common cable sheath of a conventional design. Each of the electrically separate small cables consist of a bundle of 12 transmission pairs with possibly one pair added for control and supervisory circuit. The pairs of the bundle (unit) have each a pair lay (length of pair twist) difference from lays of remaining pairs in the unit. The bundle can be assembled with three pairs in the center and nine in the outside layer.

A shield over each assembled unit may consist of a longitudinally applied folded aluminum or copper tape held around the unit by a plastic tape applied helically with an overlap or, if more efficient shielding is desired, the helical tape over the longitudinal shield may be metallic of the same metal as the longitudinal component. Several identical shielded units are then cabled together.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figures 1, 2, 3, 4:
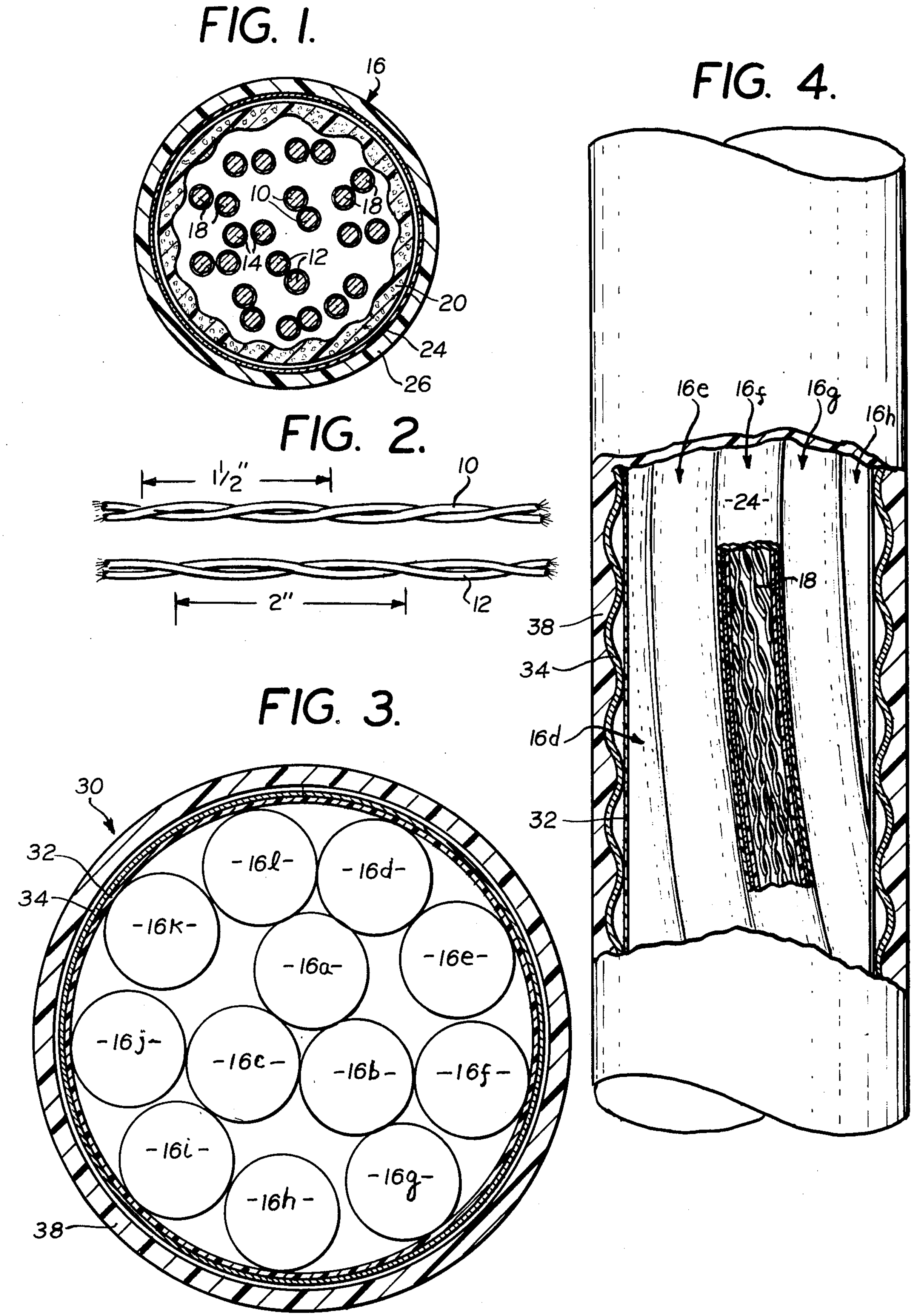
FIG. 1 is a diagrammatic cross-sectional view of one of the units of which the cable of this invention is made.
FIG. 2 is a diagrammatic view showing two pairs of conductors illustrating the difference in the twist (lay) of the pairs.
FIG. 3 is a diagrammatic view of the cable of this invention showing the way in which the units are assembled, shielded and provided with an outside plastic jacket.
FIG. 4 is a side view of the cable of FIG. 3 with parts broken away to illustrate the construction when viewed from the side of the cable.

FIG. 1 shows a pair of insulated conductors 10, another pair of insulated conductors 12 are located in the same region as the pair 10 but somewhat lower down. A third pair of insulated conductors 14 is shown at an intermediate level. These three pairs 10 – 14 are each twisted with a different lay, as will be explained in connection with FIG. 2.

The pairs 10, 12 and 14 are located centrally in a cable unit 16; and there are other pairs of conductors, each indicated by the reference chracter 18 located in a circle around the three pairs 10 – 14. Each of the pairs 18 is twisted and all of the pairs in the unit 16 have a different lay to their twist.

The pairs 10, 12, 14 and 18 are assembled in a bundle which preferably has some twist; the three pairs 10, 12 and 14 being in the center and the 9 pairs 18 forming an outside layer for a 12 pair bundle. The unit 16 can be made with more or less pairs in the bundle.

To lock the pairs 10, 11, 14 and 18 together and prevent lay distortion when the bundle is handled in manufacturing processes or at installation, a thin jacked of foamed polyethylene 20 is extruded over the bundle. The pairs can be held together in the bundle in other ways, if desired, as by applying a tape made of foamed thermoplastic supported by a film such as Mylar or polypropylene, or other material.

A metal shield 24 is placed over the jacket of foamed material 20. One of the advantages of the jacket or tape of foamed material 20, in addition to holding the pairs assembled in the bundle, is that the foamed material separates the pairs from proximity to the metal shield 24 which is applied over the foam.

The shield 24 is preferably a longitudinally applied folded aluminum or copper tape held around the unit 16 by a plastic insulating tape 26 applied helically with an overlap or the helical tape may be applied over the longitudinal shield and may be of the same metal as the longitudinal shield, as previously explained.

FIG. 2 shows the pair 10 with a helical lay of 1½ inches as indicated by the dimension arrow. FIG. 2 also shows the pair 12 with a lay of 2 inches, also indicated by a dimension arrow. In FIG. 2 the insulated conductors of the pairs 10 and 12 are shown loosely twisted for better illustration. Each pair within the unit 16 has a different lay to its twist so that crosstalk separation is obtained between the pairs. One of the advantages of using a unit 16 which contains a relatively small number of pairs is that the difference in lay between the different pairs can be larger, within the permissible range of 5 inches to 1.5 inches, than is the case where there are more pairs in the same bundle of pairs.

FIG. 3 shows a communication cable with approximately 144 pairs. This communication cable, designated by the reference character 30 is made up of 12 units 16 and in FIG. 2 these units are indicated by the reference character 16 with a different letter *a* through *p* appended.

The cable 30 is made up of 12 units with three central units 16*a*, 16*b* and 16*c* and with the other units arranged in a circle around the central units as clearly shown in FIG. 3. The units 16 are cabled and then wrapped with a standard core wrap, such as Mylar 32. A moisture impervious shield 34 is placed over the core wrap 32.

This shield 34 may be a strip of aluminum foil with a polyolefin coating on both sides to protect it from corrosion. Adhesive polyethylene is commonly used for such shields and the strip from which the shield 34 is made can be folded longitudinally around the core of the cable 30 with the edge portions at the seam bonded together in accordance with the conventional practice.

This shield 34 is preferably circumferentially corrugated as shown in FIG. 4.

A protective jacket 38 is extruded over the shield 34 to provide a smooth outside surface; and this jacket 38 is preferably made of high density polyethylene or other plastic which is tough enough to protect the shield 34 from mechanical injury during handling and under the conditions in which the cable 30 is to be used.

FIG. 4 shows the units 16*d*, 16*e*, 16*f*, 16*g* and part of the unit 16*f* as they are cabled with a long lay. The outer shield 24 and the foam 20 are broken away for a portion of the exposed length of the unit 16*f* so as to show the pairs 18 within the unit 16*f*. All of the units 16 are preferably of the same construction, as previously explained, but because of the shielding around each unit the pairs in one unit do not disturb the pairs in the next unit.

The pairs 10, 12, 14 and 18 are locked in reference to each other by means of the foamed jacket 20 or foamed tape, previously described. The interstices between the pairs in the unit 16 are preferably left with only air within them. It is unnecessary to use filling compound in the units 16 because these units are protected from contact with moisture in the cable 30.

If the cable 30 is to be used under conditions where damage to the shield 32 is likely to occur, then the cable 30 is filled between the units 16 with cable filling compound. This prevents water which gets into the cable 30 through a break in the cable shield from running down hill and accumulating hydrostatic pressure to force itself under the overlap of the Mylar which is helically applied to the group of unit 16 under the metallic shield 34.

Since the units 16 themselves are not filled, the cable of this invention has the advantages of a filled cable in the event of a break in the shield 34, but still has air around the pairs in the separate units 16 with resulting lower capacitance and smaller dimension of the cable.

The preferred embodiment of the invention has been illustrated and described, but it will be understood that the cables of this invention can be made with more or fewer pairs in the individual units 16 and that the cable 30 can be made with more or fewer units. Any of the units can be used for one or another direction of transmission and the number of units, individually shielded, is limited only by the consideration of outside diameter of the cable 30 to fit available duct space.

Changes and modifications can be made in the construction illustrated and some features can be used in different combinations without departing from the invention as defined in the claims.

What is claimed is:

1. A communication cable including in combination a number of conductor pairs, each of which includes two conductors twisted together along a course which is a helix, and each pair having the pitch of its helix different from that of the other pairs, the helix differences being greater than 0.15 inch, means holding the pairs bundled together in a unit, a conducting shield around the unit, a plurality of like units shielded from one another by their respective shields and cabled together to form a core for the cable, and a common enclosure surrounding all of the units and holding them together in the communication cable.

2. The communication cable described in claim 1 characterized by all of the shields of the units having an outer covering by which the shields are insulated from one another and each of said shields being individually grounded.

3. The communication cable described in claim 1 characterized by all of the units being of the same construction and having the same helix pitches.

4. The communication cable described in claim 1 characterized by the common enclosure being an overall conducting shield, and means holding the units together to form the core of the cable including a wrap by which the overall conducting shield is insulated from the units.

5. The communication cable described in claim 4 characterized by the overall shield being made of metal and insulated from the shields of the units.

6. The communication cable described in claim 1 characterized by the shield of each unit being a metal strip folded longitudinally around the bundle of pairs and covered with insulation.

7. The communication cable described in claim 1 characterized by the pairs of each unit being cabled by twisting them together, and a foamed jacket locking said pairs in their relation to one another to prevent distortion of their helixes during processing and installation of the cable.

8. The communication cable described in claim 7 characterized by the foamed jacket being an extrudate covering the cabled pairs of the unit under the conducting shield of the unit.

9. The communication cable described in claim 1 characterized by the cable being connected in a communication line with some of the units transmitting messages in one direction and others transmitting messages in the opposite direction.

10. The communication cable described in claim 1 characterized by each of the units being in effect an individual cable with a metal shield insulated from the shields of the other units, said shields being continuous through cable splices and being carried at terminations into the housings of repeaters.

* * * * *